United States Patent
Ban et al.

[11] Patent Number: 6,019,693
[45] Date of Patent: *Feb. 1, 2000

[54] METHOD FOR MOUNTING TWO AUXILIARY MACHINES TO AUTOMOBILE AND POWER TRANSMISSION DEVICE

[75] Inventors: Takashi Ban; Hidefumi Mori; Kiyoshi Yagi; Tatsuya Hirose, all of Kariya, Japan

[73] Assignee: Kabushiki Kaisha Toyoda Jidoshokki Seisakusho, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/812,322

[22] Filed: Mar. 5, 1997

[30] Foreign Application Priority Data

Mar. 8, 1996 [JP] Japan ................................ 8-051447

[51] Int. Cl.[7] .............................. F16H 7/24; F16H 55/49; F16H 55/36
[52] U.S. Cl. ...................... 474/150; 474/170; 474/199; 474/903
[58] Field of Search ..................................... 474/144, 148, 474/150, 166, 168, 170, 198, 199, 902, 903; 192/48.2, 48.8, 84.961, 84.2

[56] References Cited

U.S. PATENT DOCUMENTS

| | | | |
|---|---|---|---|
| 4,287,976 | 9/1981 | Sakaki et al. | 474/170 |
| 4,455,812 | 6/1984 | James | 192/48.8 |
| 5,029,684 | 7/1991 | Ishii | 192/48.8 |
| 5,195,623 | 3/1993 | Sommer | 192/48.2 |
| 5,295,812 | 3/1994 | Steele | 192/84.961 |
| 5,413,535 | 5/1995 | Reik | 474/902 |
| 5,535,864 | 7/1996 | Ishii et al. | 192/48.2 |
| 5,667,050 | 9/1997 | Hasegawa | 192/84.961 |
| 5,683,299 | 11/1997 | Kishibuchi et al. | 192/84.961 |
| 5,687,823 | 11/1997 | Nakagawa et al. | 192/84.961 |

FOREIGN PATENT DOCUMENTS 5-8633  1/1993  Japan .

OTHER PUBLICATIONS

Japanese Utility Model Patent Application 3–61176 and the corresponding English Translation Abstract.

*Primary Examiner*—John A. Jeffery
*Assistant Examiner*—Matthew A. Kanese
*Attorney, Agent, or Firm*—Burgess, Ryan & Wayne

[57] ABSTRACT

Two auxiliary machines are mounted in tandem to an automobile and coupled together by a power transmitting device to transmit power of the engine to both of two auxiliary machines. The power transmitting device includes a rotor, a first hub portion adapted to be operably connected to the rotor and fixed to the drive shaft of the first auxiliary machines and a second hub portion adapted to be operably connected to the rotor and fixed to the drive shaft of the second auxiliary machine First and second hub portions are rotatable simultaneously or separately. An electromagnetic clutch can be inserted in the power transmission device.

10 Claims, 4 Drawing Sheets

METHOD FOR MOUNTING TWO AUXILIARY MACHINES TO AUTOMOBILE AND POWER TRANSMISSION DEVICE

BACKGROUND OF THE INVENTION

1. Field of the Invention

The present invention relates to a method for mounting two auxiliary machines to an automobile and a power transmitting device therefor.

2. Description of the Related Art

An automobile has a power unit such as an internal combustion engine mounted in the automobile. An automobile also includes auxiliary machines acting auxiliarily to the power unit, such as a water pump, an idler, a hydraulic pump for a power steering system, an alternator, a compressor for an automobile air conditioning system and so on. These auxiliary machines have drive shafts to which power transmission members such as pulleys or electromagnetic clutches are attached. The power transmission members are connected to pulleys on the crankshaft of the engine via a belt and driven by the engine.

In mounting the auxiliary machines to the automobile, it is necessary to arrange the auxiliary machines in the restricted space around the engine. In addition, it is desired to reduce the cost for mounting the auxiliary machines to the automobile, by reducing the respective power transmission members to save the number of the parts.

Japanese Unexamined Patent Publication (Kokai) No. 5-8633 discloses an automobile air conditioning device which includes two auxiliary machines, i.e., a viscous fluid type heat generator (herein, referred to a viscous heater) and a compressor. The viscous heater and the compressor are arranged to satisfy the above described requirements. That is, the housing of the viscous heater and the housing of the compressor are integrally formed as a unit, and a part of the drive shaft of the viscous heater and the drive shaft of the compressor are also formed as a unit. An electromagnetic clutch acting as a power transmission member is arranged on the remaining part of the drive shaft of the viscous heater. In addition, these auxiliary machines are mounted to the automobile, by fixing the housing of the viscous heater and compressor to the engine or to the automobile, using a single bracket.

However, in the above described mounting method, it is necessary to modify the housing of the viscous heater and the housing of the compressor, and the manufacturing process of two auxiliary machines becomes complicated and the manufacturing cost increases.

SUMMARY OF THE INVENTION

The object of the present invention is to overcome the above described problems and to provide a method for mounting two auxiliary machines to an automobile and a power transmitting device adapted for use in this method.

The other object of the present invention is to provide a method for mounting two auxiliary machines to an automobile and a power transmitting device used in this method, in which two auxiliary machines can be arranged in a restricted space and one or some of the power transmission members can be omitted without rendering the manufacturing process complicated, so that the manufacturing cost and thus the mounting cost can be decreased.

According to the present invention, there is provided a method for mounting first and second auxiliary machines to an automobile having a power unit, said method comprising the step of: coupling a drive shaft of the first auxiliary machine and a drive shaft of the second auxiliary machine in tandem by a power transmitting device driven by the power unit of the automobile and transmitting power of the power unit to both said first and second auxiliary machines. By this method, two auxiliary machines can be arranged in a restricted space and one or some of the power transmission members can be omitted without rendering the manufacture process complicated so that the manufacture cost and thus the mounting cost can be decreased.

The auxiliary machines can be a water pump, an idler, a hydraulic pump for a power steering system, an alternator, a viscous heater, a compressor for an automobile air conditioning system and so on. The viscous heater may be preferably used at a cold location.

Preferably, the method further comprises the step of fixing a housing of the first auxiliary machine and a housing of the second auxiliary machine to the power unit or to the automobile via a common bracket. By this feature, it is possible to reduce the number of the parts and thus the manufacturing cost.

According to the present invention, there is provided a power transmitting device in an automobile having a power unit and first and second auxiliary machines, each of the first and second auxiliary machines having a housing and a drive shaft. The power transmitting device comprises a rotor driven by the power unit of the automobile, a first hub portion adapted to be operably connected to the rotor and fixed to the drive shaft of the first auxiliary machine, and a second hub portion adapted to be operably connected to the rotor and fixed to the drive shaft of the second auxiliary machine. Thus, the power transmitting device is adapted to couple the drive shaft of the first auxiliary machine and the drive shaft of the second auxiliary machine in tandem to transmit power of the power unit to both said first and second auxiliary machines.

Preferably, the power transmitting device further comprises a common bracket to which the housings of the first and second auxiliary machines are attached.

Preferably, the first hub portion and said second hub portions are arranged in an opposing relationship on a common axis.

The rotor is rotatably supported by at least one of the housings of said first and second auxiliary machines and driven by the power unit of the automobile via a belt.

The first and second hub portions may be fixed to each other to rotate simultaneously.

The at least one of the first and second hub portions may be coupled to the rotor via an electromagnetic clutch.

One of the first and second hub portions may be coupled to the rotor via an electromagnetic clutch, and the other of the first and second hub portions is directly coupled to the rotor.

One of the first and second hub portions may be coupled to the rotor via a first electromagnetic clutch, and the other of the first and second hub portions is coupled to the rotor via a second electromagnetic clutch.

One of the first and second hub portions may be coupled to the rotor via an electromagnetic clutch, the electromagnetic clutch having a solenoid coil arranged on one of the housings of the first and second auxiliary machines, and an armature carried by one of the drive shaft of the first and second auxiliary machines, the armature being attracted to the rotor when voltage is applied across the solenoid coil.

BRIEF DESCRIPTION OF THE DRAWINGS

The other objects and features of the present invention will become more apparent from the following description of the preferred embodiments, with reference to the accompanying drawings, in which.

DESCRIPTION OF THE PREFERRED EMBODIMENTS

Figure 1:
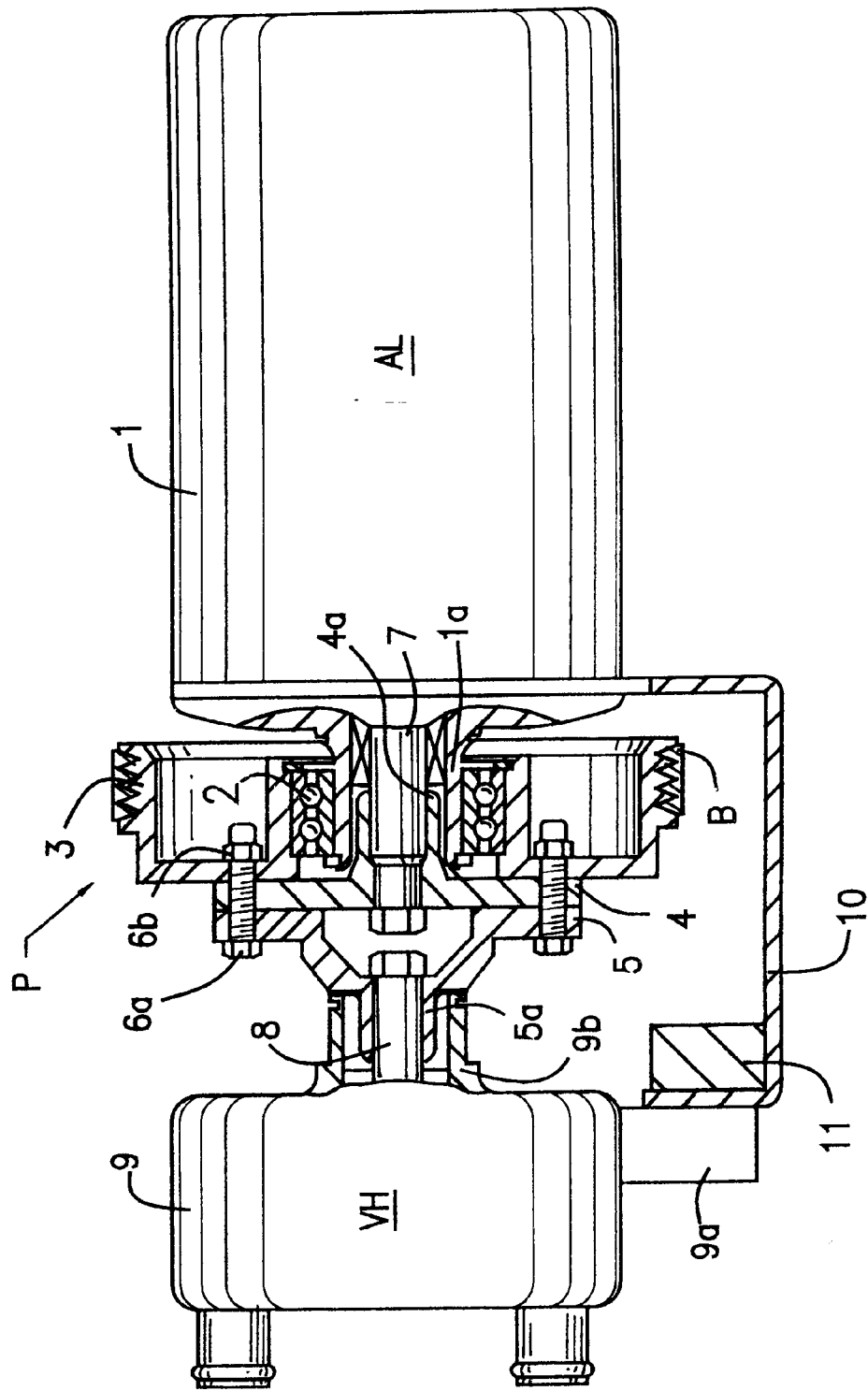
FIG. 1 is a partially cross-sectional, side view of the power transmitting device with two auxiliary machines mounted to an automobile according to the first embodiment of the present invention.

Referring to the drawings, FIG. 1 shows the first embodiment of the present invention, in which an alternator AL and a viscous fluid type heat generator (hereinafter, referred to a viscous heater) VH are shown as examples of auxiliary machines which work auxiliarily relative to a power unit, such as an internal combustion engine, of an automobile. The automobile is not shown in the drawing, but it is representatively shown by a housing 11 of the engine. The alternator AL and the viscous heater VH are mounted to the automobile and driven by the engine via a power transmitting device disclosed herein. The alternator AL has a housing 1 with a boss portion 1a and a drive shaft 7. The viscous heater VH also has a housing 9 with a boss portion 9b and a drive shaft 8.

The power transmitting device has a rotor 3 arranged about the boss portion 1a of the housing 1 of the alternator AL and rotatably supported by a bearing 2 on the boss portion 1a. A pulley P is formed on the outer peripheral surface of the rotor 3 and includes V-shaped grooves to receive a belt B by which the pulley P is connected to a pulley (not shown) of the crankshaft of the engine. Therefore, the rotor 3 can be driven by the engine.

A first hub member 4 and a second hub member 5 are fixed to each other and to the rotor 3 by a plurality of bolts 6a and nuts 6b. The first hub member 4 has an axial projection 4a extending into the boss portion 1a of the housing 1 and a central hole therethrough, so that the first hub member 4 can be fixed to the drive shaft 7 of the alternator AL. The second hub member 5 has an axial projection 5a extending into the boss portion 9b, the axial projection 5a extending reverse to the axial projection 4a of the first hub member 4, and a central hole therethrough, so that the second hub member 5 can be fixed to the drive shaft 8 of the viscous heater 9. In this manner, the first and second hub portions 4 and 5 are arranged in an opposite relationship on a common axis and the drive shafts 7 and 8 can be arranged and coupled in tandem.

The viscous heater 9 also has an outwardly extending flange 9a. The flange 9a of the housing 9 and the housing 1 of the alternator AL are fixed to a common bracket 10 which is fixed to the housing 11 of the engine. It is also possible to fix the housing 9 of the viscous heater VH and the housing 1 of the alternator AL to the automobile via the common bracket 10.

In this embodiment, the rotor 3 is driven by the engine (power unit) via a belt B, and the first and second hub members 4 and 5 rotationally drive the drive shafts 7 and 8 of the alternator AL and the viscous heater VH. The drive shaft 7 of the alternator AL and the drive shaft 8 of the viscous heater VH are normally in the operating condition while the engine operates. Therefore, the viscous heater VH can quickly heat the compartment in the automobile and the alternator AL can normally charge the battery.

In the method for mounting two auxiliary machines and an automobile, the drive shaft 7 of the alternator AL and the drive shaft 8 of the viscous heater VH are connected in tandem by the power transmitting device including the pulley P, the rotor 3 and the first and second hub members 4 and 5 to transmit power of the engine to both the alternator AL and the viscous heater VH. In this mounting method and in the power transmitting device used for this method, it is not necessary to modify the housing 1 and the drive shaft 7 of the alternator AL and the housing 9 and the drive shaft 8 of the viscous heater VH.

Therefore, according to this method, it is possible to satisfy the need to mount the alternator AL and the viscous heater VH in a restricted mounting space and the requirement to omit one of the pulleys, which would otherwise be necessary. It is therefore possible to reduce the manufacturing cost of the alternator AL and the viscous heater VH, without any difficulty in manufacturing the alternator AL and the viscous heater VH.

Also, in this method, it is possible to reduce the mounting cost during the mounting operation of the alternator AL and the viscous heater VH to the automobile, thanks to the simple arrangement and the reduction of the parts, since the housing 1 of the alternator AL and the housing 9 of the viscous heater VH are fixed to the engine via the common bracket 10.

Figure 2:
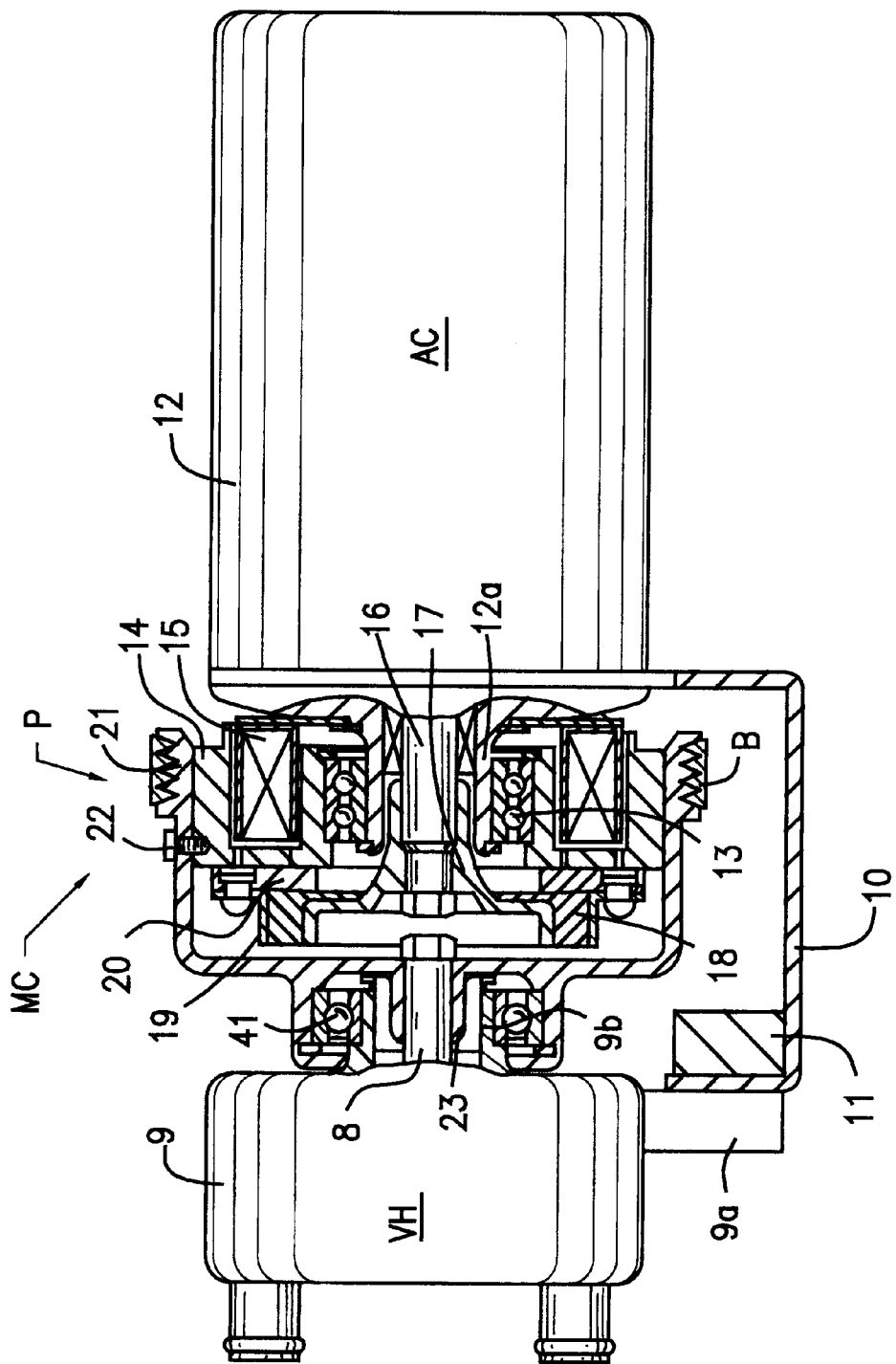
FIG. 2 is a partially cross-sectional, side view of the power transmitting device with two auxiliary machines mounted to an automobile according to the second embodiment of the present invention.

FIG. 2 shows the second embodiment of the present invention, in which a compressor AC for an automobile air conditioning system and a viscous heater VH are shown as examples of auxiliary machines. The viscous heater VH is similar to that of FIG. 1. The compressor AC has a housing 12 and a drive shaft 16 and also driven by the engine via a power transmitting device. In this case, the power transmitting device includes an electromagnetic clutch MC having a solenoid coil 15 and an armature 20.

The power transmitting device has a rotating member 14 arranged about the boss portion 12a of the housing 12 of the compressor AC and rotatably supported by a bearing 13 on the boss portion 12a. The solenoid coil 15 of the electromagnetic clutch MC is attached to the housing 12 of the compressor AC and located in the ring-shaped recess in the rotating member 14 at the rear side thereof. The armature 20 of the electromagnetic clutch MC is arranged facing the front surface of the rotating member 14 so that the armature 20 is attracted toward the rotating member 14 by the magnetic force of the solenoid coil 15 when voltage is applied across the solenoid coil 15.

The drive shaft 16 of the compressor AC is fixed to a first hub member 17 extending in the boss portion 12a, the first hub member 17 being connected to the armature 20 via a rubber member (elastic member) 18 and a flange 19. A cup-shaped member 21 is fixed to the rotating member 14 by bolts 22, and is rotatably supported by a bearing 41 on a boss portion 9b of the housing 9 of the viscous heater VH. The cup-shaped member 21 has a pulley P and a second hub portion 23 which extends reverse to the first hub member 17 and is fixed to the drive shaft 8 of the viscous heater VH. In this manner, the first and second hub portions 17 and 23 are arranged in an opposite relationship on a common axis and the drive shafts 16 and 8 are arranged and coupled in tandem. In this case, the cup-shaped member 21 and the rotating member 14 constitute a rotor. The other arrangement is similar to the first embodiment.

In this embodiment, the cup-shaped member 21 and the rotating member 14 are driven by the engine (power unit) via a belt B. The armature 20 is attracted to the rotating member 14 by the magnetic force of the solenoid coil 15 and rotates with the cup-shaped member 21 and the rotating member 14 while the solenoid coil 15 is energized. Thus, the first hub member 17 rotationally drives the drive shaft 16 of the compressor AC while the armature 20 rotates. Also, the second hub member 23 rotationally drives the drive shaft 8 of the viscous heater VH while the cup-shaped member 21 and the rotating member 14 rotate. The solenoid coil 15 can be deenergized according to a signal to stop the drive shaft 16 of the compressor AC while the engine is rotating. The drive shaft 8 of the viscous heater VH is always in the operating condition. Therefore, it is possible to satisfy the requirements, in a cold location, that the viscous heater VH can quickly heat the compartment in the automobile and that the compressor AC can sometimes operate.

In the method for mounting two auxiliary machines to an automobile in this embodiment, it is possible to obtain advantages similar to those of the previous embodiment.

Figure 3:
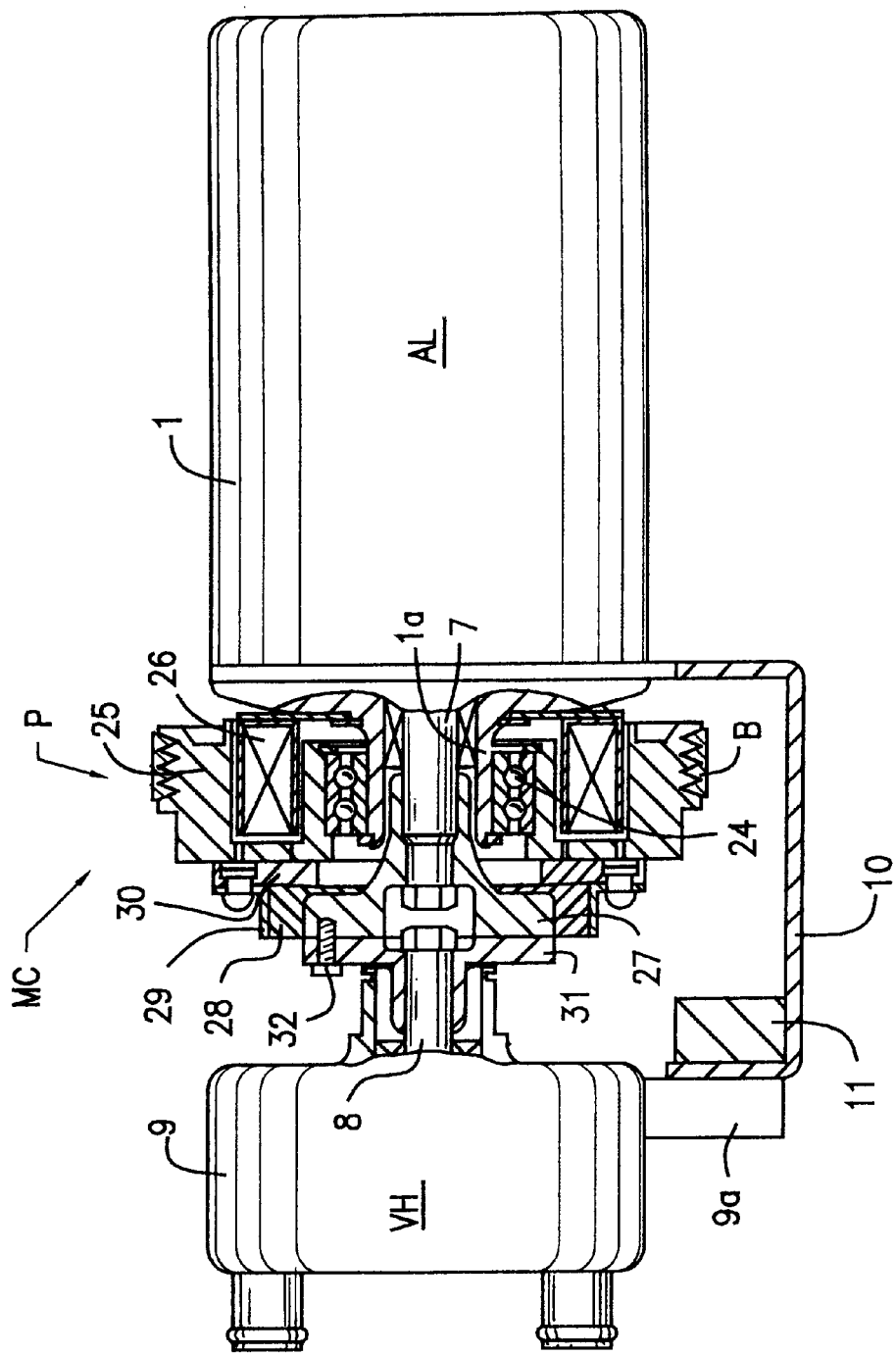
FIG. 3 is a partially cross-sectional, side view of the power transmitting device with two auxiliary machines mounted to an automobile according to the third embodiment of the present invention.

FIG. 3 shows the third embodiment of the present invention, in which an alternator AL and a viscous heater VH are shown as examples of auxiliary machines. The alternator AL and the viscous heater VH are similar to those of FIG. 1. In this case too, the power transmitting device includes an electromagnetic clutch MC.

The power transmitting device has a rotor 25 arranged about the boss portion 1a of the housing 1 of the alternator AL and rotatably supported by a bearing 24 on the boss portion 1a. The rotor 25 has a pulley P. A solenoid coil 26 of the electromagnetic clutch MC is attached to the housing 1 of the alternator AL and located in the ring-shaped recess in the rotor 25 at the rear side thereof.

The drive shaft 7 of the alternator AL is fixed to a first hub member 27 extending in the boss portion 1a, and the first hub member 27 is connected to the armature 30 via a rubber member (elastic member) 28 and a flange 29, the armature 30 facing the front surface of the rotor 25. A second hub portion 31 which extends reverse to the first hub member 27 is fixed to the first hub member 27 by bolts 32. The second hub portion 31 is fixed to the drive shaft 8 of the viscous heater VH. In this manner, the first and second hub portions 27 and 31 are arranged in an opposite relationship on a common axis and the drive shafts 16 and 8 are arranged and coupled in tandem. The other arrangement is similar to the first embodiment.

In this embodiment, the rotor 25 is driven by the engine (power unit) via a belt B. The armature 30 is attracted to the rotor 25 by the magnetic force of the solenoid coil 26 and rotates with the first rotating member 25 while the solenoid coil 26 is energized. Thus, the first hub member, 27 rotationally drives the drive shaft 7 of the alternator AL and the second hub member 31 rotationally drives the drive shaft 8 of the viscous heater VH while the armature 30 rotates. The solenoid coil 15 can be deenergized according to a signal to simultaneously stop the drive shaft 7 of the alternator AL and the drive shaft 8 of the viscous heater VH while the engine is rotating. The drive shaft 8 of the viscous heater VH is always in the operating condition. Therefore, it is possible to realize the requirement in the initial stage of the operation of the engine such that the viscous heater VH can quickly heat the compartment in the automobile and the alternator AL can charge the battery, and in the later stage of the operation of the engine, it is possible to stop the heating by the viscous heater VH and to prevent overcharging by the alternator AL.

In the method for mounting two auxiliary machines to an automobile in this embodiment, it is possible to obtain advantages similar to those of the previous embodiment.

Figure 4:
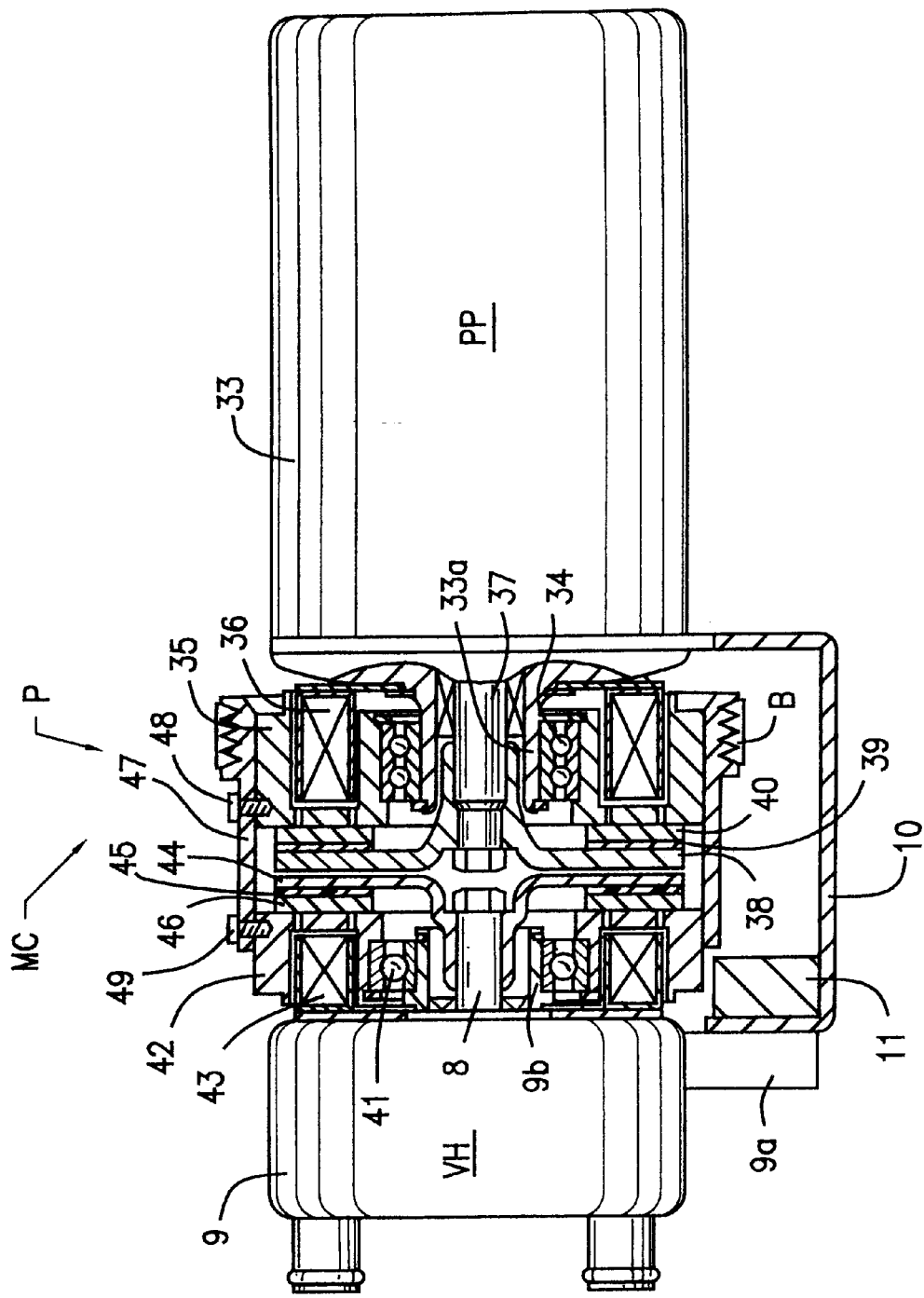
FIG. 4 is a partially cross-sectional, side view of the power transmitting device with two auxiliary machines mounted to an automobile according to the fourth embodiment of the present invention.

FIG. 4 shows the fourth embodiment of the present invention, in which a hydraulic pump PP for a power steering system and a viscous heater VH are shown as examples of auxiliary machines. The pump PP has a housing 33 and a drive shaft 37 and the viscous heater VH is similar to that of FIG. 1. In this case, the power transmitting device includes electromagnetic clutches.

The power transmitting device has a first rotating member 35 arranged about the boss portion 33a of the housing 33 of the pump PP and rotatably supported by a bearing 34 on the boss portion 33a. A first solenoid coil 36 of the first electromagnetic clutch is attached to the housing 33 of the pump PP and located in the ring-shaped recess in the first rotating member 35 at the rear side thereof. The drive shaft 37 of the pump PP is fixed to a first hub member 38 extending in the boss portion 33a, and the first hub member 38 is connected to a first armature 40 of the first electromagnetic clutch via a rubber member (elastic member) 38 and a flange 39, the first armature 40 facing the front surface of the first rotating member 35.

The power transmitting device has a second rotating member 42 arranged about the boss portion 9b of the housing 9 of the viscous heater VH and rotatably supported by a bearing 41 on the boss portion 9b. A second solenoid coil 43 of the second electromagnetic clutch is attached to the housing 9 of the viscous heater VH and located in the ring-shaped recess in the second rotating member 42 at the rear side thereof. The drive shaft 8 of the viscous heater VH is fixed to a second hub member 44 extending in the boss portion 9b of the viscous heater VH, and the second hub member 44 is connected to a second armature 46 of the second electromagnetic clutch via a rubber member (elastic member) 45 and a flange 46, the armature 46 facing the front surface of the second rotating member 42.

A cylindrical member 47 is fixed to the first and second rotating members 35 and 42 by bolts 48 and 49. The cylindrical member 47 has a pulley P. The first and second rotating members 35 and 42 and the cylindrical member 47 constitute a rotor. In this manner, the first and second hub portions 38 and 44 are arranged in an opposing relationship on a common axis and the drive shafts 16 and 8 are arranged and coupled in tandem. The other arrangement is similar to the first embodiment.

In this embodiment, the first and second rotating members 35 and 42 and the cylindrical member 47 are driven by the engine (power unit) via a belt B. The first armature 40 is attracted to the first rotating member 35 by the magnetic force of the first solenoid coil 36 and rotates with the first and second rotating members 35 and 42 and the cylindrical member 47, and the second armature 46 is attracted to the second rotating member 42 by the magnetic force of the second solenoid coil 43 and rotates with the first and second rotating members 35 and 42 and the cylindrical member 47, while the first and second solenoid coils 36 and 43 are energized. Thus, the first hub member 38 rotationally drives the drive shaft 37 of the pump PP while the first armature 40 rotates. The second hub member 44 rotationally drives the drive shaft 8 of the viscous heater VH while the second armature 46 rotates. The first and second solenoid coils 36 and 43 can be deenergized according to respective signals to separately stop the drive shaft 37 of the pump PP and the drive shaft 8 of the viscous heater VH while the engine is rotating. Therefore, it is possible to realize the requirement in the initial stage of the operation of the engine such that the viscous heater VH can quickly heat the compartment in the automobile, and in the later stage of the operation of the engine, it is possible to stop the pump PP.

In the method for mounting two auxiliary machines to an automobile in this embodiment, it is possible to obtain advantages similar to those of the previous embodiment.

What is claimed is:

1. A method for mounting first and second auxiliary machines to an automobile having a power unit, said method comprising the step of:

coupling a drive shaft of the first auxiliary machine and a drive shaft of the second auxiliary machine in tandem to a power transmitting device arranged between said first auxiliary machine and said second auxiliary machine, said power transmitting device being driven by the power unit of the automobile and transmitting power of the power unit to both said first and second auxiliary machines.

2. The method according to claim 1, further comprising the step of:

fixing a housing of the first auxiliary machine and a housing of the second auxiliary machine to the automobile via a common bracket.

3. A power transmitting device to transmit power to a first and a second auxiliary machines, each of the first and second auxiliary machines having a housing and a drive shaft, said power transmitting device being arranged between said first auxiliary machine and said second auxiliary machine, said power transmitting device comprising:

a rotor to be driven by a power unit of an automobile;

a first hub portion adapted to be operably connected to the rotor and fixed to the drive shaft of the first auxiliary machine;

a second hub portion adapted to be operably connected to the rotor and fixed to the drive shaft of the second auxiliary machine; and whereby said power transmitting device is adapted to couple the drive shaft of the first auxiliary machine and the drive shaft of the second auxiliary machine in tandem.

4. The power transmitting device according to claim 3, further comprising a common bracket to which the housings of the first and second auxiliary machines are attached.

5. The power transmitting device according to claim 3, wherein said first and second hub portions are arranged in an opposite relationship on a common axis.

6. The power transmitting device according to claim 5, wherein said rotor is rotatably supported by at least one of the housings of said first and second auxiliary machines and driven by the power unit of the automobile via a belt.

7. The power transmitting device according to claim 6, wherein at least one of said first and second hub portions is coupled to the rotor via an electromagnetic clutch.

8. The power transmitting device according to claim 7, wherein one of said first and second hub portions is coupled to the rotor via an electromagnetic clutch, and the other of said first and second hub portions is directly coupled to the rotor.

9. The power transmitting device according to claim 6, wherein one of said first and second hub portions is coupled to the rotor via an electromagnetic clutch, the electromagnetic clutch having a solenoid coil arranged on one of the housings of the first and second auxiliary machines, and an armature carried by one of the drive shafts of the first and second auxiliary machines.

10. A power transmitting device to transmit power to a first and a second auxiliary machine having a housing and a drive shaft, said power transmitting device being arranged between said first and second auxiliary machines, said power transmitting device comprising:

a rotor rotatably supported by one of the housings of said first and second auxiliary machines adapted to be driven by a power unit of an automobile via a belt;

a first hub portion adapted to be operably connected to the rotor and fixed to the drive shaft of the first auxiliary machine;

a second hub portion adapted to be operably connected to the rotor and fixed to the drive shaft of the second auxiliary machine;

said first and second hub portions being arranged in an opposing relationship on a common axis and separately rotatable;

an electromagnetic clutch arranged between the rotor and one of the said first hub portion and said second hub portion; and whereby said power transmitting device is adapted to couple the drive shaft of the first auxiliary machine and the drive shaft of the second auxiliary machine in tandem to transmit power to both said first and second auxiliary machines.

* * * * *